United States Patent
Derryberry et al.

(10) Patent No.: US 6,498,785 B1
(45) Date of Patent: Dec. 24, 2002

(54) METHOD AND APPARATUS FOR POWER CONTROL ON A COMMON CHANNEL IN A TELECOMMUNICATION SYSTEM

(75) Inventors: Roy Thomas Derryberry, Plano, TX (US); Steven D. Gray, Dallas, TX (US); Zhigang Rong, Fort Worth, TX (US)

(73) Assignee: Nokia Mobile Phones Ltd, Espoo (FI)

( * ) Notice: Subject to any disclaimer, the term of this patent is extended or adjusted under 35 U.S.C. 154(b) by 0 days.

(21) Appl. No.: 09/165,456

(22) Filed: Oct. 2, 1998

(51) Int. Cl.$^7$ .............................. G08C 17/00; H04Q 7/20
(52) U.S. Cl. ........................................ 370/311; 455/522
(58) Field of Search ................................ 370/334–335, 370/311; 455/522, 69–70, 349

(56) References Cited

U.S. PATENT DOCUMENTS

| | | | | |
|---|---|---|---|---|
| 5,430,760 A | | 7/1995 | Dent | 375/200 |
| 5,604,730 A | * | 2/1997 | Tiedemann | 370/252 |
| 5,790,549 A | * | 8/1998 | Dent | 370/479 |
| 6,216,004 B1 | * | 4/2001 | Tiedemann | 455/442 |
| 6,233,439 B1 | * | 5/2001 | Jalali | 455/522 |
| 6,377,809 B1 | * | 4/2002 | Rezaiifar et al. | 455/522 |

OTHER PUBLICATIONS

TR45.5./98.04.03.03 The cdma2000 ITU–R RTT Candidate Submission, 1998, pp. 88–91, 99–113, Telecommunications Industry Association.

\* cited by examiner

Primary Examiner—Chau Nguyen
Assistant Examiner—Ron Abelson
(74) Attorney, Agent, or Firm—Brian T. Rivers

(57) ABSTRACT

A method and apparatus for power control on a first channel that is shared by multiple mobile stations transmitting to base stations in a telecommunication system. An initial mobile station transmission power level is set on the first channel that is shared in the random access mode. The transmission power level may be determined based on a desired performance level of the first channel. The method and system may be efficiently applied on a channel that carries a transmission in one or more bursts, with each burst including the same or a varying number of frames of varying sizes. The method and apparatus utilizes a second channel that is shared by multiple mobile stations for transmitting the power control signaling from the base stations to the mobile stations.

20 Claims, 3 Drawing Sheets

METHOD AND APPARATUS FOR POWER CONTROL ON A COMMON CHANNEL IN A TELECOMMUNICATION SYSTEM

FIELD OF THE INVENTION

This invention relates to power control in cellular telecommunication systems and, more particularly, to a method and system for power control on a common channel that may be shared by a plurality of mobile stations operating in a cellular telecommunication system.

BACKGROUND OF THE INVENTION

Power control for mobile station transmissions is an important aspect of cellular telecommunication systems. One type of cellular technology in which power control is particularly important is code division multiple access (CDMA) technology. In a CDMA-type system multiple users, each using a channel identified by a uniquely assigned digital code, simultaneously communicate with the system while sharing the same wideband frequency spectrum. In a CDMA cellular system, the signals from multiple mobile stations are received at the same frequency simultaneously at a base station. Because of the nature of CDMA demodulation, it is necessary that the signal received at the base station from each mobile station be as close as possible to a single power level so that the signal from one mobile station does not overwhelm the signal from another mobile station (near-far problem).

In a CDMA cellular system a power control process may be used to control each mobile station's transmission power level so that the signal level received at the base station from each mobile station is as close as possible to a single predetermined level. Additionally, the power control process may also be used to assure that the received signal levels at the base station are of an adequate level, so that calls are not dropped. One example of a CDMA mobile station power control scheme is the power control used by systems specified in the Telecommunications Industry Association/Electronic Industries Association (TIA/EIA) IS-95 standard. Another related CDMA mobile station power control scheme is the power control used by systems specified in the ANSI-008 standard, which is the personal communications system (PCS) 1900 MHz version of IS-95.

In IS-95, a mobile station first adjusts its transmission power level using an access channel assigned to a base station through which the mobile station is attempting to gain access to the system. To gain access, the mobile station follows an open loop power control process that involves transmitting access probe transmissions at a relatively low power level on the access channel and gradually increasing the level of subsequent access probe transmissions in access probe correction increments set by the system, until a response is obtained from the system and the mobile station gains access to the system. The access probe includes an access preamble and an access channel message capsule. The transmission power of each access probe transmission on the access channel is given by the equation:

$$\text{Mean output power (dBm)} = -\text{mean input power (dBm)} \quad (1)$$
$$-73$$
$$+\text{NOM\_PWR (dBm)}$$
$$+\text{INIT\_PWR (dBm)}$$
$$+ \text{the sum of all access probe corrections}$$

The values NOM_PWR and INIT_PWR are system parameters having values assigned by the system. The mean input power is the total received power at the mobile station antenna connector.

The ANSI-008 standard equation is similar but, because of the frequency difference, has a constant equal to 76 instead of 73 and also includes an additional value that is added to increase the range of NOM_PWR, the additional value being defined as 16*NOM_PWR_EXT, which is a system parameter. IS-95 could also be modfied to include a similar value.

Once the mobile station gains access to the system, it waits in an idle mode until a call is initiated from either the mobile station to the base station, or from the base station to the mobile station. A dedicated reverse traffic channel and a dedicated forward traffic channel are then assigned for the call. When transmitting on the IS-95 reverse traffic channel, the mobile station initializes at the power level at which access was obtained on the access channel using the open loop process defined by equation (1). Once the reverse traffic channel transmission power level is initialized and the call begins, the system and mobile station then also begin a closed loop power control process. The closed loop power control process allows the signal level received at the base station from each mobile station transmitting on a reverse traffic channel to be set as close as possible to a single predetermined level. In the closed loop power control process, the base station transmits closed loop power control corrections in the form of power control bits to the mobile station that are transmitted in a power control subchannel that is included in the forward traffic channel. A single power control bit is transmitted in the power control subchannel every 1.25 msec. A "one" bit transmitted in the power control subchannel indicates that the mobile station should increase its transmission power 1 dB, while a "zero" bit indicates that the mobile station should decrease its transmission power 1 dB. Each time a valid control bit is received at the mobile station in the power control subchannel, the mobile station adjusts its output power level up or down in an increment of 1 dB. The mobile station is capable of adjusting the transmission power within a range of ±24 dB around the level set by the open loop power control process on the access channel and, as the call is ongoing, the transmission power of the mobile station on the reverse traffic channel is adjusted so that a desired power level is reached and maintained. The mobile station also simultaneously continues the open loop power control process, this time using the forward traffic channel. In the open loop process the mean input power received on the forward traffic channel is the determining value. When involved in the call, the inputs that effect changes in the mobile station's transmission power are the mean input power as received from the base station on the forward traffic channel and the closed loop power corrections indicated by the power control bits received on the forward power control channel. During a call, the mobile station output power level on the reverse traffic channel is given by the equation:

$$\begin{aligned}\text{Mean output power (dBm)} = &-\text{mean input power (dBm)} \quad (2)\\ &-73\\ &+\text{NOM\_PWR (dBm)}\\ &+\text{INIT\_PWR (dBm)}\\ &+ \text{the sum of all access probe corrections}\\ &+ \text{the sum of all closed loop power control corrections}\end{aligned}$$

As for equation (1), the ANSI-008 standard equation is similar but, because of the frequency difference, has a constant equal to 76 instead of 73 and also includes an additional value that is added to increase the range of NOM_PWR, the additional value defined as 16*NOM_PWR_EXT, which is a system parameter.

A third generation CDMA system is being developed to provide more sophisticated and better services (data, etc.) than provided by IS-95 and eventually to replace IS-95. In the proposed standard for third generation CDMA known as CDMA 2000 TTU-R RTT, it has been proposed that third generation systems have a common control channel that is not used in IS-95. The reverse common control channel (R-CCCH) has been proposed as a common random access channel to be shared by multiple mobile stations to allow transmissions to the system without explicit authorization by a base station. It is planned that the R-CCCH be used for control signaling and data transmissions. Each R-CCCH is distinguished by a different long code. Each R-CCCH also has a corresponding forward common control channel (F-CCCH) that carries transmissions from a base station. The F-CCCH is shared by multiple mobile stations with each data or control signaling transmission on the F-CCCH including address information indicating the particular mobile station to which it is addressed. Data transmitted on the R-CCCH would be included in the access channel message capsule portion of the access probe. In the CDMA 2000 TTU-R RTT standard, it is proposed that the same type of access probe sequence power control as used for the access channel in IS-95 be used for transmission on the R-CCCH.

Because of differences between IS-95 and third-generation systems, the use of IS-95 access channel or similar type power control on the R-CCCH could cause problems in third generation CDMA systems. If the access probe sequence type is begun and received at too high a transmission power, the base station will not signal the mobile station to adjust its transmission power downward during the transmission and the R-CCCH transmission may disturb transmissions of other mobile stations. Also, the F-CCCH is shared by multiple mobile stations, and transmissions on the R-CCCH may be made in one or more bursts, with each burst including the same or a varying number of frames. With the third generation system R-CCCH potentially carrying a substantial amount of data and signaling, capacity could be lost due to delay from the need to transmit an overly long access probe sequence in order to receive acknowledgment, when the access probe sequence is begun at too low a power level.

OBJECTS OF THE INVENTION

It is an object and advantage of this invention to provide a method and system for power control on a channel that is shared by multiple users in a telecommunication system.

Another object and advantage of this invention is to provide a method and system for power control on a channel that is shared by multiple users through random access in a telecommunication system.

A further object and advantage of this invention is to provide a method and system for power control on a channel that carries transmissions in one or more bursts, with each burst including the same or a varying number of frames of varying sizes.

SUMMARY OF THE INVENTION

The present invention provides a method and apparatus for power control on a channel that is shared by multiple mobile stations transmitting to base stations in a telecommunication system. The mobile stations may share the channel in the random access mode. The method and apparatus allows the system to set an initial mobile station transmission power level and may be efficiently applied on a channel that carries a transmission in one or more bursts, with each burst including the same or a varying number of frames of varying sizes. The method and apparatus utilizes a common channel that is shared by multiple mobile stations for transmitting the power control signaling from the base station to the mobile station.

In an embodiment of the invention, the method and system is implemented on a reverse common control channel (R-CCCH) of a code division multiple access (CDMA) system. Prior to the transmission of data or control information by a mobile on the R-CCCH, a parameter measurement is performed at the base station on a reverse measurement channel that is associated with the R-CCCH and has a transmission power level that has a predetermined relationship with the transmission power level of the R-CCCH. The reverse measurement channel may be a reverse pilot channel associated with the R-CCCH, and the measurements may be performed during an initial access probe from the mobile station on the R-CCCH. A power value associated with the parameter measured on the measurement channel is then determined. The power value may indicate the ratio of the energy per bit, $E_b$, to the effective noise power spectral density, $N_t$, value for both the R-CCCH and measurement channel combined. The power value is compared to a predetermined threshold power value in the base station. In the embodiment, the predetermined threshold power value that is compared to the power value may be determined based on a probability of frame error rate that is associated with a desired probability of a transmission on the R-CCCH being successful. The predetermined threshold power value may indicate a threshold ratio of energy per bit, $E_b$, to the effective noise power spectral density, $N_t$, for both the R-CCCH and measurement channel combined. The base station then transmits a power control message to the mobile station that includes a power control command indicating a power control increment or, alternatively, a transmission power level for the mobile station on the R-CCCH according to the comparison of the power value and the predetermined threshold power value. The power control message may be transmitted to the mobile station on a forward common control channel (F-CCCH). After receiving the power control message, the mobile station transmits the data or control information using an initial transmission power according to the power control command. During the transmission on the R-CCCH, multiple measurements are made on the reverse measurement channel. The time interval $T_m$ between the measurements may be based upon the sizes of the frames available on the F-CCCH for sending the power control messages. The F-CCCH may have multiple frame sizes available. In the embodiment, F-CCCH frame sizes of 5 msec, 10 msec or 20 msec are used, giving a $T_m$ of 5 msec, 10 msec or 20 msec and a power control update frequency of 200 Hz, 100 Hz or 50 Hz. Each power control message may include the electronic serial number (ESN) of the mobile station to which the base station is transmitting the power control message. If a burst of N frames transmitted by the mobile station after receiving the power control message, including the power command, results in a frame error rate greater than the rate used to determine the threshold power value used to generate the power control command, the transmission of the burst may be repeated using a new threshold power level that is determined from a frame error rate that is assigned with a successively higher probability of a burst on the R-CCCH being successful, until the burst is received correctly or a timeout occurs.

BRIEF DESCRIPTION OF THE DRAWINGS

The above set forth and other features of the invention are made more apparent in the ensuing Detailed Description of the Invention when read in conjunction with the accompanying drawings wherein.

DETAILED DESCRIPTION OF THE INVENTION

Figure 1:
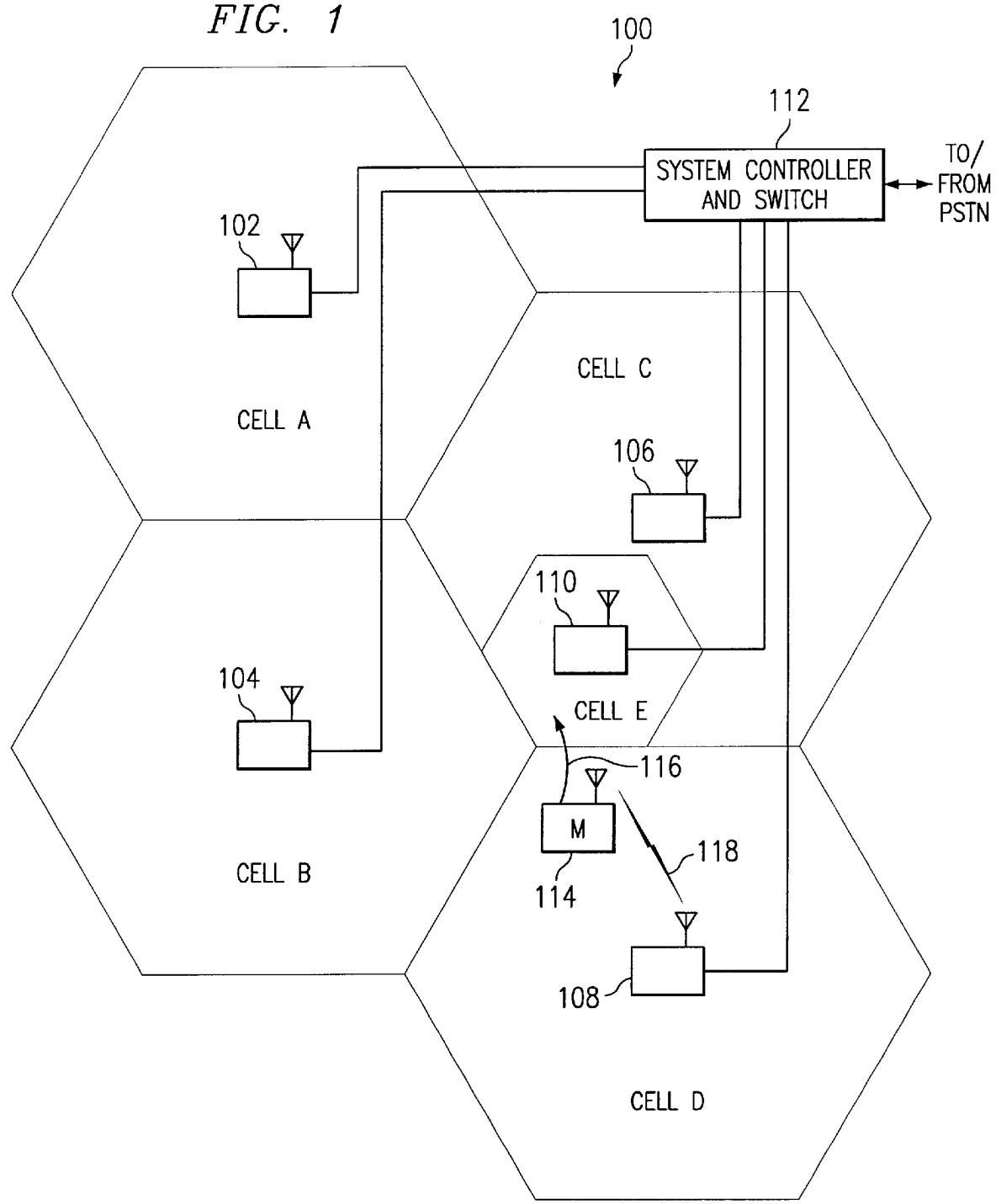
FIG. 1 illustrates a block diagram of a telecommunications system constructed according to an embodiment of the present invention.

FIG. 1 illustrates a block diagram of a telecommunication system 100 constructed according to an embodiment of the present invention. System 100 comprises mobile station 114, and an infrastructure comprising system controller and switch 112 and base stations 102, 104, 106, 108 and 110. A subscriber who subscribes to service provided by the operator of cellular system 100 may use mobile station 114 to make and receive phone calls over traffic channels of a radio interface, such as shown by radio interface 118 between mobile station 114 and base station 108, as the subscriber moves throughout the coverage area of cellular system 100. Radio interface 118 may include shared common radio access channels for mobile station to base station (reverse link) transmissions and common control channels for base station to mobile station (forward link) transmissions. The shared reverse link random access channels may carry control information or data that may be transmitted in discrete bursts of varying lengths, depending on the application. In FIG. 1, power control is implemented on the shared reverse link access channel according to the invention. A mobile station may attempt to obtain access to a random access channel when it is necessary for the mobile station to transmit the control information or data to a base station. The forward link common control channel may carry control information or data that is addressed to a specific mobile station. A mobile station that may receive information or data on the forward link common channel monitors all transmissions for information identifying that a particular transmission is addressed to the mobile.

Each of base stations 102, 104, 106, 108 and 110 provides coverage over a separate area of system 100, shown as cell A, cell B, cell C, cell D and cell E, respectively, in FIG. 1. Base stations 102, 104, 106, 108 and 110 are connected to system controller and switch 112 by connections as in a conventional cellular system. System controller and switch 112 may be connected to a public switched telephone network to allow subscribers of cellular system 100 to make and receive phone calls from the landline public network. In the embodiment of FIG. 1, cell A, cell B, cell C and cell D are shown to be of about the same size and may be the size of what is commonly called a "microcell" or a cell of about 500 meters in width. A micro cell of system 100 may require a maximum mobile station transmission power level of approximately 200 mw. Cell E of system 100 is shown to be contained within the coverage area of cell C and may be the size of what is commonly called a "picocell" or a cell of about 100 meters in width. A picocell of system 100 may require a maximum mobile station transmission power level of approximately 20 mw.

In the embodiment of FIG. 1, cellular system 100 may operate according to the Code Division Multiple Access (CDMA) cellular system standard specified in the document, "The CDMA 2000 ITU-R RTT Candidate Submission," published by the Telecommunications Industry Association, TR-45.5 Subcommittee, Apr. 2, 1998 (CDMA 2000), with the system modified by the implementation of power control on the random access channels according to the embodiment of the invention. The method and apparatus of the invention has application to all types of telecommunication systems that use similar access principles, such as, for example, time division multiple access (TDMA) systems.

Figure 2:
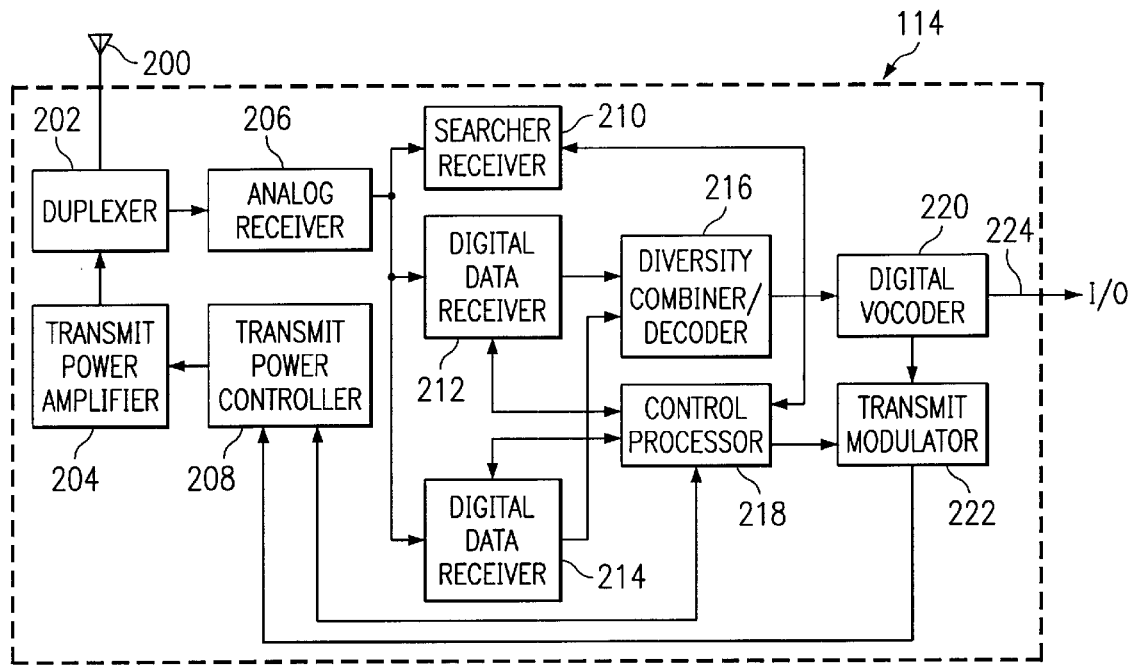
FIG. 2 is a block diagram of portions of a mobile station of the embodiment of the invention shown in FIG. 1.

Referring now to FIG. 2, therein is a block diagram of portions of mobile station 114 of the embodiment of the invention shown in FIG. 1. Mobile station 114 comprises antenna 200, duplexer 202, transmit power amplifier 204, analog receiver 206, transmit power controller 208, searcher receiver 210, digital data receiver 212, digital data receiver 214, diversity combiner/decoder 216, control processor 218, digital vocoder 220, transmit modulator 222 and user interface 224. Antenna 200 is coupled to analog receiver 206 through duplexer 202. Signals received at antenna 200 are input to analog receiver 206 through duplexer 202. The received signals are then converted to baseband frequency and then filtered and digitized in analog receiver 206 for input to digital data receiver 212, digital data receiver 214 and searcher receiver 210. The digitized baseband signal input to digital data receiver 212, digital data receiver 214 and searcher receiver 210 may include signals from many ongoing calls, including control information and data transmitted on the forward common control channel (F-CCCH), together with the pilot carriers transmitted by the base station of the cell site in which the mobile station is currently located, plus the pilot carriers transmitted by the base stations in all neighboring cell sites. Digital data receiver 212 and digital data receiver 214 perform correlation on the baseband signal with a pseudo random noise (PN) sequence of a desired received signal. The output of digital data receivers 212 and 214 is a sequence of encoded data signals from two independent paths. Searcher receiver 210 scans the time domain around the nominal time of a received pilot signal of a base station for other multi-path pilot signals from the same base station and for other signals transmitted from different base stations. Searcher receiver 210 measures the strength of any desired waveform at times other than the nominal time. Searcher receiver 210 generates signals to control processor 218 indicating the strengths of the measured signals to control processor 218.

The encoded data signals output from digital data receiver 212 and digital data receiver 214 are input to diversity combiner/decoder 216. In diversity combiner/decoder 216 the encoded data signals are aligned and combined, and the resultant data signal is then decoded using error correction and input to digital vocoder 220. Digital vocoder 220 then outputs information signals to the user interface 224. User interface 224 may be a handset with a keypad or another type of user interface, such as a laptop computer monitor and keyboard.

For transmission of signals from mobile station 114, a signal received at user interface 224 is input to digital vocoder 220 in digital form as, for example, data or voice that has been converted to digital form at user interface 224. In digital vocoder 220 the signal is encoded and output to transmit modulator 222. Transmit modulator 222 Walsh encodes the signal and then modulates the Walsh encoded signal onto a PN carrier signal, with the PN carrier sequence being the PN carrier sequence of the CDMA channel to which the mobile station is assigned. The PN carrier information is transmitted to mobile station 114 from the system 100 and transferred to control processor 218 from digital data receivers 212 and 214 after being received from the system. Control processor 218 sends the PN carrier information to transmit modulator 222. The PN modulated signal is then output from transmit modulator 222 to transmit power controller 208. Transmit power controller 208 sets the level of the transmission power of mobile station 114 according to commands received from control processor 218. In the embodiment of the invention, the transmission power used on the reverse control channel (R-CCCH) for selected transmissions is determined by control processor 218 according to power control commands received from the base station on the forward common control channel (F-CCCH). The transmission power used on the reverse pilot channel (R-PICH) associated with the R-CCCH is also determined by control processor 218 according to power control commands received from the base station on the F-CCCH). Control processor 218 also generates commands that set the transmission data rate, frame sizes and number of frames used in transmissions on the R-CCCH. The commands that set transmission data rate, frame sizes and number of frames may also be generated by control processor 218 according to control commands received from the system on the F-CCCH.

The modulated signal is then output from transmit power controller 208 to transmit power amplifier 204 where the signal is amplified and converted to an RF signal. The RF signal is then output from transmit power amplifier 204 to duplexer 202 and transmitted from antenna 200.

Figure 3:
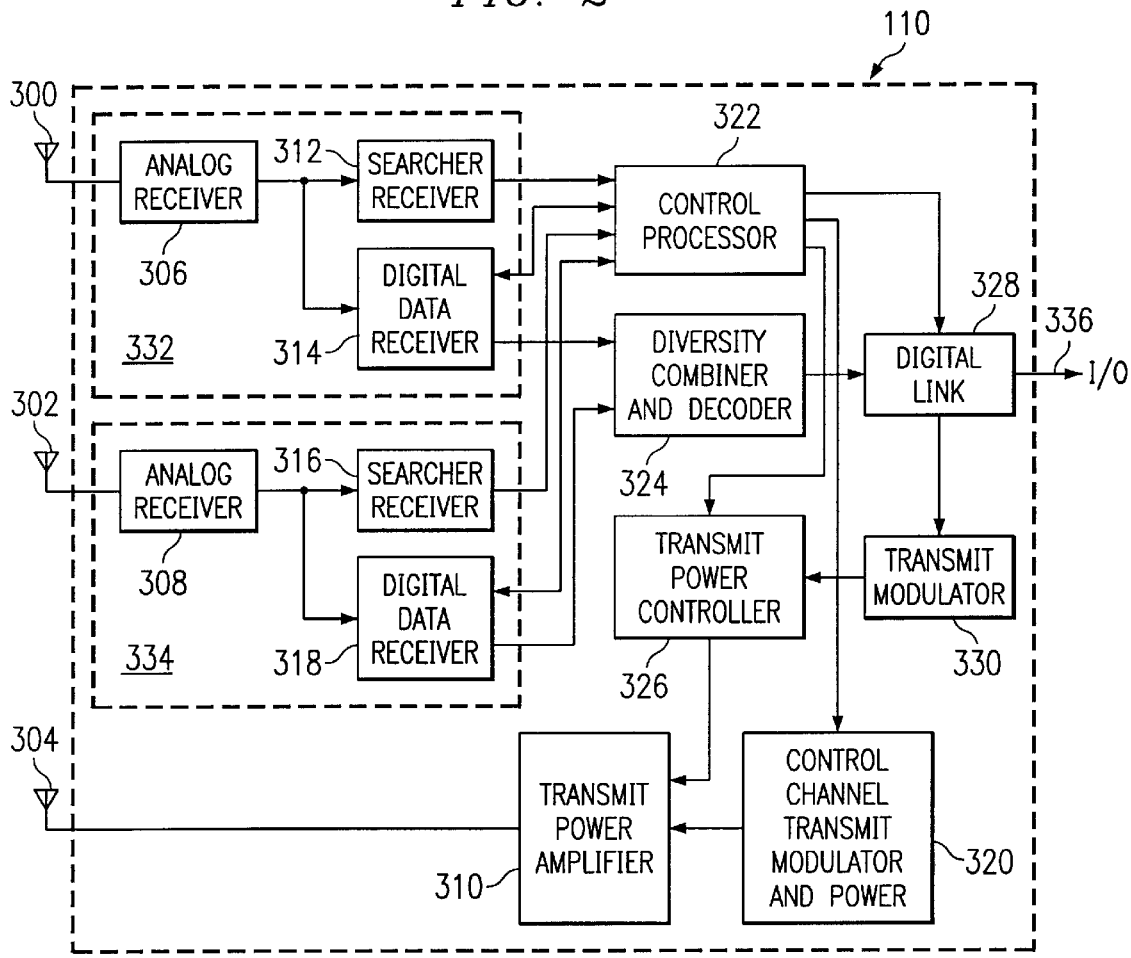
FIG. 3 is a block diagram of portions of a base station of the embodiment of the invention shown in FIG. 1.

Referring now to FIG. 3, therein is a block diagram of portions of a base station 110 of the embodiment of the invention shown in FIG. 1. The block diagrams of any of the other base stations 102, 104, 106, and 108 of FIG. 1 may be equivalent to that shown in FIG. 3 for base station 110. Base station 110 includes a first receiver section 332, a second receiver section 334, control processor 322, diversity combiner/decoder 324, transmit power controller 326, digital link 328, input/out I/O 336, transmit modulator 330, control channel transmitter/modulator 320, transmit power amplifier 310, and antenna 304. First receiver section 332 comprises antenna 300, analog receiver 306, searcher receiver 312 and digital data receiver 314. Second receiver section 334 comprises antenna 302, analog receiver 308, searcher receiver 316 and digital data receiver 318.

First receiver section 332 and second receiver section 334 provide space diversity for a single signal that may be received at both antennas 300 and 302. The signals received at antenna 300 are input to analog receiver 306 where the signal is filtered, converted to baseband frequency and digitized to generate a digital signal. The digital signal is then output from analog receiver 306 to searcher receiver 312 and digital data receiver 314. Searcher receiver 312 scans the time domain around the received signal to verify that digital data receiver 314 tracks the correct signal. Searcher receiver 312 may detect the access preamble that is transmitted on the CDMA 2000 reverse pilot channel (R-PICH) associated with a mobile station that is transmitting an initial access message on an R-CCCH. The R-PICH is a channel that is spread by a CDMA code of all zeros and transmitted immediately before, as the access preamble, and simultaneously during an initial access probe and message on the R-CCCH. The R-PICH allows the base station to acquire the access probe message. Searcher receiver 312 may also perform received power measurements on the R-PICH according to the embodiment of the invention. Control processor 322 generates the control signals for digital data receiver 314 according to a signal received from the searcher receiver 312, so that the correct signal is received at digital data receiver 314. Digital data receiver 314 generates the proper PN sequence necessary to decode the digital signal received from analog receiver 306 and generates weighted output symbols for input to diversity combiner/decoder 324. Antenna 302, analog receiver 308, searcher receiver 316 and digital data receiver 318 of second receiver section 334 function identically to the components of first receiver section 332 to generate a second set of weighted output symbols. The weighted symbols from digital data receiver 314 and digital data receiver 318 are then combined and decoded in diversity combiner/decoder 324 to generate received digital data which is then output through digital link 328 and I/O 336 to system controller and switch 112 of FIG. 1.

When data received from system controller and switch 112 is to be transmitted from base station 110 on a traffic channel, the data is received at digital link 328 over I/O 336 and sent to transmit modulator 330. Transmit modulator 330 then modulates the data using the appropriate Walsh function assigned to the mobile station to which the base station is transmitting. The Walsh modulated data is then spread by a channel PN sequence having the appropriate time shift and input to transmit power controller 326. Control information and data are also transmitted by base station 110 on an F-CCCH to mobile stations. Transmit power controller 326 controls the transmission power of base station 110 in response to control signals received from control processor 322. The power control commands may be generated by software in control processor 322. The signal output from transmit power controller 326 is input to transmit power amplifier 310 and then transmitted from antenna 304. Base station 110 may have multiple transmit modulator and transmit power controllers for transmitting to multiple mobile stations. In the embodiment of the invention, control processor 322 includes software for generating the power control commands to be transmitted on an F-CCCH to mobile stations that are transmitting to base station 110 on an R-CCCH. Control processor 322 may generate these commands according to power measurement results received from searcher receiver 312. Control processor 322 may also generate control commands to be transmitted on an F-CCCH to a mobile station to control frame size and number of frames used by the mobile station on the R-CCCH.

In system 100, a pilot channel that may be used for handoff measurements is generated by each base station. The pilot channel generated for each base station of system 100 is unique, with each pilot identified by the time shift (or phase) of the PN sequence transmitted from the particular base station rather than by a unique PN sequence. The pilot channel for base station 110 may be generated in control channel transmitter/modulator 320 in response to control signals generated by control processor 322. The pilot channel signal may be generated by using a Walsh code sequence of all zeros and multiplying the Walsh code sequence by the system PN sequence to generate a pilot channel signal having the appropriate phase for the base station 110.

Figure 4:
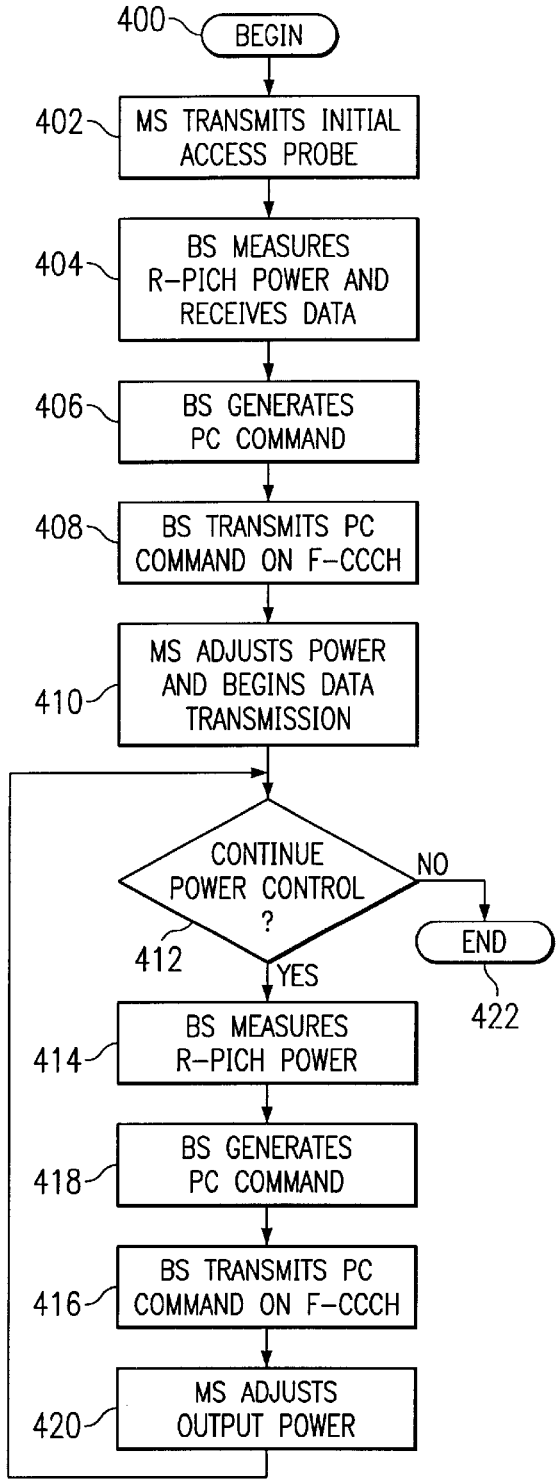
FIG. 4 is a flow diagram illustrating process steps of power control performed according to an embodiment of the invention.

Referring now to FIG. 4, therein is a flow diagram illustrating process steps of power control performed according to an embodiment of the invention. FIG. 4 illustrates steps that are performed by a mobile station (MS) and base station (BS). In an exemplary description, the process may be described with reference to mobile station 114 and base station 108 of FIG. 1.

The process begins at step 400 when control processor 218 of mobile station 114 determines that it is necessary for mobile station 114 to transmit control information or data to base station 108 on an R-CCCH. At step 402, control processor 218 generates the appropriate control signals to transmit modulator 222, so that an initial access probe is transmitted to base station 108. The access probe is transmitted as a CDMA 2000 access probe at successively higher power until base station 108 acknowledges receipt of the access probe. The access probe includes a preamble and an access probe message.

Next, at step 404, searcher receiver 312/316 of base station 110 detects the preamble of the access probe and measures the received power, the parameter $P_{pr}$ on the R-PICH and transfers the measurement results to control processor 322. Data contained in the access probe message is also received and transferred to control processor 322. This data includes a data parameter indicating how much control information or data mobile station 114 needs to transmit on the R-CCCH. The data parameter may indicate the number M of frames toabe transmitted in a burst or transmission. Next, at step 406, a power control (PC) command is generated in base station 108. Control processor 322 may generate the PC command by the process illustrated in FIG. 5.

Figure 5:
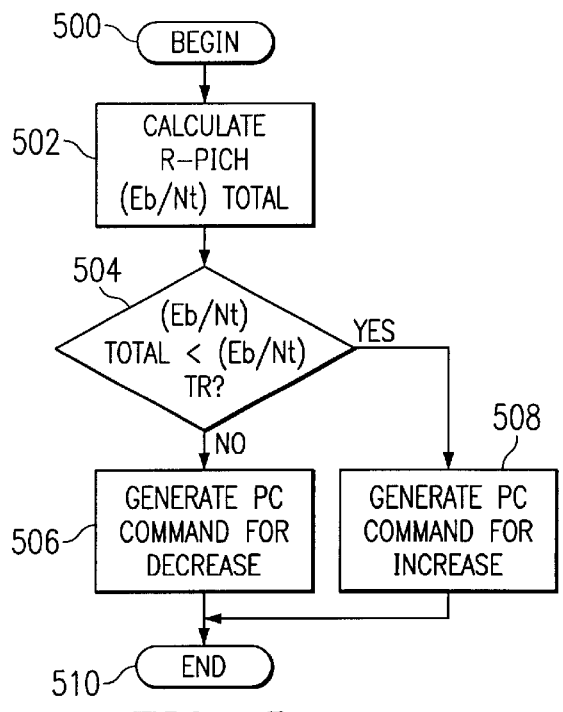
FIG. 5 is a flow diagram illustrating process steps performed when generating a power control command according to an embodiment of the invention.

Referring now to FIG. 5, therein is a flow diagram illustrating process steps performed when generating a power control command according to an embodiment of the invention. FIG. 5 illustrates process steps performed by control processor 322 based on the received power, $P_{pr}$, on the R-PICH. The process begins at step 500. At step 502, control processor 322 calculates the power value $(E_b/N_t)_{pilot}$, from the parameter $P_{pr}$ where $E_b$ is the energy per bit on the R-PICH and $N_t$ is the effective noise power spectral density on the channel. From $(E_b/N_t)_{pilot}$ control processor 322 then calculates the power value $(E_b/N_t)_{total}$, which is the combined energy per bit/effective noise power spectral density ratio for both the R-CCCH and R-PICH combined. $(E_b/N_t)_{total}$, may be estimated from the fact that the power levels of the R-CCCH and R-PICH have a predetermined relationship. For example, in the CDMA 2000 system specification, the transmit power on the R-PICH is one-fourth the transmit power on the R-CCCH, $P_{pr}/P_{rd}=4$, $(E_b/N_t)_{total}$ then equals 5 $(E_b/N_t)_{pilot}$. $(E_b/N_t)_{total}$ is then compared with a threshold power value, $(E_b/N_t)_{tr}$ for R-CCCH and R-PICH combined at step 504. The threshold power level may be determined based on a parameter specifying a desired frame error rate (FER) and an associated probability ( ) of the complete transmission of M frames on the R-CCCH being successful. Assuming that the mobile station transmits M frames in an R-CCCH transmission, the probability of the transmission being successful, , can be computed as follows:

$$\propto = (1 - P(FE))^M \qquad (1)$$

Similarly, the probability of a frame error can be derived as a function of and M:

$$P(FE) = 1 - e^{\frac{\ln\infty}{M}} \qquad (2)$$

An FER of X implies that on the average P(FE)=X. In determining $(E_b/N_t)_{total}$, it is assumed that P(FE)=FER.

The power value $(E_b/N_t)_{total}$ may be determined for a particular from a look-up table stored in memory of control processor 322. The look-up table may be generated by quantifying the worst case required received $(E_b/N_t)_{total}$ to achieve a particular FER and its associated on a single path Rayleigh fading channel.

If, at step 504, it is determined that $(E_b/N_t)_{total}$ is less than $(E_b/N_t)_{tr}$, the process moves to step 508. At step 508, control processor 322 generates a power control command that includes a parameter set to a value that instructs mobile station 114 to increase the total transmit power such that $(E_b/N_t)_{total}$ for the control information or data transmission on the R-CCCH plus the level on the R-PICH is close to the level of $(E_b/N_t)_{tr}$. If, however, at step 504 it is determined that $(E_b/N_t)_{total}$ is greater than $(E_b/N_t)_{tr}$, the process moves to step 506. At step 506, control processor 322 generates a power control command that includes a parameter set to a value that instructs mobile station 114 to decrease the total transmit power such that $(E_b/N_t)$twl for the control information or data transmission on the R-CCCH plus the level on the R-PICH is close to the level of $(E_b/N_t)_{tr}$. The process then ends at step 510 and returns to step 408 of FIG. 4.

Alternatively, control processor 322 could generate a power control command that indicates the direction, up or down, of an incremental change in transmission power to be made at the mobile station to move the transmission power in a desired direction.

Figure 6:
FIG. 6 illustrates a format of a power control message according to an embodiment of the invention.

Next, referring again to FIG. 4, at step 408, control processor 322 generates the appropriate commands to control channel transmit modulator and power controller 320, so that the power control command is transmitted to mobile station 114 on the F-CCCH. In the embodiment, because the F-CCCH is shared by multiple mobile stations operating in the system, the power control message on the F-CCCH may include information identifying mobile station 114 as the mobile station to which the power control command is addressed. In the embodiment of the invention, 5 msec, 10 msec and 20 msec frames are available on the F-CCCH to carry the power control message. The identifying information may be the electronic serial number (ESN) of the mobile station to which the power control is addressed. Alternatively, another identifying field, such as the international mobile station identity (IMSI), may be used. FIG. 6 illustrates a possible format for the power control message.

Next, at step 410, mobile station 114 receives the power control message on the F-CCCH. Control processor 218 then generates the appropriate commands to transmit power controller 208, so that the control information or data transmission is begun at the appropriate power level. At step 412, a determination is made as to whether or not power control is to be continued for the next succeeding power control period. The power control period may be set as equal to the smallest frame size available on the F-CCCH, to give the smallest increments in power control resolution. The power control measurements may be made on the R-PICH at, for example, the rate of every 5 msec, even though the R-CCCH is carrying the transmission in 20 msec frames. If other mobile stations are simultaneously involved in the power control process, the power control provided for a particular mobile station could be increased to, for example, every two 5 msec frames. In the embodiment, the power control will continue until the complete control information or data transmission of M frames is finished.

If at step 412 it is determined that the power control is not to be continued, the process moves to step 422 and ends. If, however, it is determined that the power control is to be continued, the process moves to step 414. At step 414, searcher receiver 312 measures the power on the R-PICH. Next, at step 418, control processor 322 generates the appropriate power control commands as per FIG. 5. At step 416, control processor 322 generates the appropriate commands to control channel transmit modulator and power controller 320, so that the power control command is transmitted to mobile station 114 on the F-CCCH. The power control command generated at step 416 is formatted the same as the power control command generated at step 408.

At step 420, mobile station 114 receives the power control message on the F-CCCH. Control processor 218 then generates the appropriate commands to transmit power controller 208, so that the control information or data transmission is continued at the appropriate level for the next time period equal to the power control period. Steps 412–420 are then repeated until the control information or data transmission of M frames is completed on the R-CCCH. In the embodiment using 5 msec frame on the F-CCCH, steps 412–420 will be repeated every 5 msec or at the rate of 200 Hz until the process is complete.

The method and apparatus has application to any telecommunication system in which mobile stations transmit in bursts on a common channel to the system.

Thus, while the invention has been particularly shown and described with respect to preferred embodiments thereof, it will be understood by those skilled in the art that changes in form and scope may be made thereon without departing from the scope and spirit of the invention.

What is claimed is:

1. A method for controlling the transmission power of a transmission from a mobile station to a base station on a first channel in a telecommunication system, wherein said first channel is shared by a plurality of mobile stations, said method comprising the steps of:
   (a) measuring a first parameter value on a second channel, the second channel having a predetermined power relationship with the first channel, and determining a first power value from said first parameter at the base station;
   (b) determining a second power value from at least a second parameter, said second parameter indicating a desired performance level for the transmission on the first channel;
   (c) comparing said first power value and said second power value, and determining a third parameter value based on said predetermined power relationship and said comparison between said first power value and said second power value at the base station, said third parameter value for controlling transmission power of the mobile station in said first channel; and
   (d) transmitting a message from the base station to the mobile station on a third channel, formed of a common control channel, said message including said third parameter value, said common control channel used by the base station upon which to transmit to said plurality of mobile stations.

2. The method of claim 1, wherein step (b) comprises determining a second power value from a desired fame error rate and a number M of frames to be transmitted in the transmission on the first channel.

3. The method of claim 2, wherein said second power value comprises a threshold $E_b/N_t$ value.

4. An apparatus for controlling the transmission powder at a transmission from a mobile station in a telecommunication system having a reverse channel and a forward shared channel shared by a plurality of mobile stations, said apparatus comprising:
   a base station comprising:
      a receiver for measuring a first parameter on a measurement channel associated with the reverse channel, the measurement channel having a predetermined, power relationship with the reverse channel;
      a processor coupled to said receiver, said processor for determining a first power value from at least a second parameter, said second parameter indicating a desired performance level for the transmission on the reverse channel and for determining a second power value from said first parameter measured by said receiver, said processor, further, for comparing said first power value and said second power value, determining a third parameter based on said predetermined power relationship and said comparison between said first power value and said second power value, said third parameter for controlling transmission power of the mobile station on the reverse channel and generating a message including said third parameter; and
      a transmitter for transmitting said message to the mobile station on the forward shared channel.

5. The apparatus of claim 4, wherein said receiver comprises a first receiver, said processor comprises a first processor and said transmitter comprises a first transmitter, and wherein said apparatus further comprises:
   a second receiver for receiving said message on the forward channel and generating a signal, including said third parameter;
   a second processor for receiving said signal from said receiver and generating a power control signal according to said third parameter; and
   a second transmitter coupled to said second said power control signal and transmitting a transmission to said first receiver on the reverse channel, wherein an initial power level for said transmission is set according to said third parameter.

6. The apparatus of claim 5, wherein said processor determines said first power value from a desired frame error rate and a number M of frames to be transmitted.

7. The apparatus of claim 5, wherein said first power value comprises a threshold $E_b/N_t$ value.

8. A method for controlling the transmission power of a transmission from a mobile station to a base station on a first channel in a telecommunication system, wherein said first channel is shared by a plurality of mobile stations, said method comprising the steps of:
   (a) measuring a first parameter value on a second channel and determining a first power value from said first parameter at the base station, the second channel having a predetermined power relationship with the first channel;
   (b) determining a second power value from at least a second parameter, said second parameter indicating a desired performance level for the transmission on the first channel;
   (c) comparing said first power value and said second power value, and determining a third parameter value based on said predetermined power relationship and said comparison between said first power value and said second power value at the base station, said third parameter value for controlling transmission power of the mobile station in said first channel;
   (d) transmitting a message from the base station to the mobile station on a third channel, said message including said third parameter value, and said third channel comprising a common control channel over which the base station transmits to said plurality of mobile stations; and
   (e) transmitting a transmission from the mobile station to the base station on said first channel, wherein an initial power level for said transmission is set according to said third parameter.

9. The method of claim 8, wherein step (d) further comprises transmitting said message in a frame having a length, and wherein said method further comprises the steps of:
   repeating steps (a), (c) and (d), at a rate that is a function of said length during said transmission from said mobile station to said length during said transmission from said mobile station to said base station; and
   setting a subsequent power level for said transmission from said mobile station according to said third parameter generated on each repetition of steps (a), (c) and (d).

10. A method for controlling the transmission power of a transmission from a mobile station to a base station on a first channel in a telecommunication system, wherein said first channel is shared by a plurality of mobile stations, said method comprising the steps of:
   (a) measuring a first parameter value on a second channel and determining a first power value from said first parameter at the base station, the second channel having a predetermined power relationship with the first channel;
   (b) determining a second power value from at least a second parameter, said second parameter indicating a desired performance level for the transmission on the first channel;
   (c) comparing said first power value and said second power value, and determining a third parameter value based on said predetermined power relationship and said comparison between said first power value and said second power value at the base station, said third parameter value for controlling transmission power of the mobile station in said first channel; and
   (d) transmitting a message from the base station to the mobile station on a third channel, said message, forming a frame including identifying information for the mobile station and including said third parameter value, and said third channel comprising a common control channel over which the base station transmits to said plurality of mobile stations.

11. A method for controlling the transmission power of a transmission from a mobile station to a base station on a first channel in a telecommunication system, wherein said first channel is shared by a plurality of mobile stations, said method comprising the steps of:
   (a) measuring a received power on a second channel and determining, therefrom a measured $E_b/N_t$ value for said first channel and said second channel, combined, at the base station, the second channel having a predetermined power relationship with the first channel;
   (b) determining a threshold $E_b/N_t$ value for said first channel and said second channel, combined, from at least a desired frame error rate, said desired frame error rate indicating a desired performance level for the transmission on the first channel;
   (c) comparing said threshold $E_b/N_t$ value with said measured $E_b/N_t$ value, and determining a third parameter value based on said predetermined power relationship and said comparison between said threshold $E_b/N_t$ value and said measured $E_b/N_t$ value at the base station, said third parameter value for controlling transmission power of the mobile station in said first channel; and
   (d) transmitting a message from the base station to the mobile station on a third channel, said message including said third parameter value, and said third channel comprising a common control channel over which the base station transmits to said plurality of mobile stations.

12. A method for controlling the transmission power of a transmission from a mobile station to a base station on a random access channel in a CDMA system, wherein said random access channel is shared by a plurality of mobile stations, said method comprising the steps of:
   (a) measuring a first parameter value on a pilot channel and determining a first power value from said first parameter at the base station, a predetermined relationship existing between transmission power levels of said random access channel and said pilot channel, the pilot channel having a predetermined power relationship with the random access channel;
   (b) determining a second power value from at least a second parameter, said second parameter indicating a desired performance level for the transmission on the random access channel;
   (c) comparing said first power value and said second power value, and determining a third parameter value based on said predetermined power relationship and said comparison between said first power value and said second power value at the base station, said third parameter value for controlling transmission power of the mobile station in the random access channel; and
   (d) transmitting a message from the base station to the mobile station on a third channel, said message including said third parameter value, and said third channel comprising a common control channel over which the base station transmits to said plurality of mobile stations.

13. The method of claim 12, wherein step (a) comprises measuring a first parameter value on said pilot channel at least during transmission of an access probe on said random access channel and determining a first power value from said first parameter value and, wherein step (b) comprises receiving at least a second parameter value on said random access channel during transmission of said access probe on said random access channel and determining a second power value from said at least a second parameter, said at least a second parameter indicating a desired performance level for the transmission on the first channel.

14. The method of claim 13, wherein step (d) further comprises transmitting said message in a frame having a length, and wherein said method further comprises the steps of:
repeating steps (a), (c) and (d), at a rate that is a function of said length.

15. An apparatus for controlling the transmission power at a transmission from a mobile station in a telecommunication system having a reverse channel and a forward channel shared by a plurality of mobile stations, said apparatus comprising:
a base station comprising:
a first receiver for measuring a first parameter on a measurement channel associated with the reverse channel, the measurement channel having a predetermined power relationship with the reverse channel;
a first processor coupled to said first receiver, said first processor for determining a first power value from at least a second parameter, said second parameter indicating a desired performance level for the transmission on the reverse channel and for determining a second power value from said first parameter measured by said first receiver, said first processor, further, for comparing said first power value and said second power value, determining a third parameter based on said power relationship and said comparison of said first power value and said second power value, said third parameter for controlling transmission power of the mobile station on the reverse channel and generating a message including said third parameter;
a first transmitter for transmitting said message, formed of a frame having a frame length, to the mobile station on the forward channel, wherein said first receiver, first processor and first transmitter repeatedly generate said message including said third parameter at a rate that is a function of said length during said transmission from said second transmitter to said first receiver on the reverse channel, and wherein, for each repetition, said third parameter indicates a power level for readjusting said transmission subsequent to said initial power level;
said apparatus further comprising:
a second receiver for receiving said message on the forward channel and generating a signal, including said third parameter;
a second processor for receiving said signal from said receiver and generating a power control signal according to said third parameter; and
a second transmitter coupled to said second processor to receive indications of said power control signal and transmitting a transmission to said first receiver on the reverse channel, wherein an initial power level for said transmission is set according to said third parameter.

16. An apparatus for controlling the transmission power at a transmission from a mobile station in a telecommunication system having a reverse channel and a forward channel shared by a plurality of mobile stations, said apparatus comprising:
a base station comprising:
a first receiver for measuring a first parameter on a measurement channel associated with the reverse channel, the measurement channel having a predetermined power relationship with the reverse channel;
a first processor coupled to said receiver, said first processor for determining a first power value from at least a second parameter, said second parameter indicating a desired performance level for the transmission on the reverse channel and for determining a second power value from said first parameter measured by said first receiver, said first processor, further, for comparing said first power value and said second power value, determining a third parameter based on said power relationship and said comparison of said first power value and said second power value, said third parameter for controlling transmission power of the mobile station on the reverse channel and generating a message including said third parameter; and
a first transmitter for transmitting said message to the mobile station on the forward channel, said message comprising a frame including identifying information;
said apparatus further comprising:
a second receiver for receiving said message on the forward channel and generating a signal, including said third parameters.

17. An apparatus for controlling the transmission power at a transmission from a mobile station in a telecommunication system having a reverse channel and a forward channel shared by a plurality of mobile stations, said apparatus comprising:
a base station comprising:
a first receiver for measuring a received power on a measurement channel associated with the reverse channel, the measurement channel having a predetermined power relationship with the reverse channel;
a first processor coupled to said receiver, said first processor for determining a threshold $E_b/N_t$ value for said reverse channel and said measurement channel, combined, from at least a second parameter, said second parameter indicating a desired performance level for the transmission on the reverse channel and for determining a measured $E_b/N_t$ value for said reverse channel and said measurement channel, combined, value from said first parameter measured by said first receiver, said first processor, further, for comparing said first threshold $E_b/N_t$ value and said measured $E_b/N_t$ value, determining a third parameter based on said predetermined power relationship and said comparison of said said first threshold $E_b/N_t$ value and said measured $E_b/N_t$ value, said third parameter for controlling transmission power of the mobile station on the reverse channel and generating a message including said third parameter;
a transmitter for transmitting said message to the mobile station on the forward channel;

said apparatus further comprising:
- a second receiver for receiving said message on the forward channel and generating a signal, including said third parameter;
- a second processor for receiving said signal from said receiver and generating a power control signal according to said third parameter; and
- a second transmitter for receiving said power control signal and transmitting a transmission to said first receiver on the reverse channel, wherein an initial power level for said transmission is set according to said third parameter.

18. An apparatus for controlling the transmission power at a transmission from a mobile station in a CDMA system having a random access channel and a forward channel shared by a plurality of mobile stations, said apparatus comprising:
- a base station comprising:
  - a receiver for measuring a first parameter on a pilot channel associated with the random access channel, the pilot channel having a predetermined power relationship with the reverse channel;
  - a processor coupled to said receiver, said processor for determining a first power value from at least a second parameter, said second parameter indicating a desired performance level for the transmission on the random access channel and for determining a second power value from said first parameter measured by said receiver, said processor, further, for comparing said first power value and said second power value, determining a third parameter based on said power relationship and said comparison of said first power value and said second power value, said third parameter for controlling transmission power of the mobile station on the random access channel and generating a message including said third parameter; and
  - a transmitter for transmitting said message to the mobile station on the forward channel.

19. The apparatus of claim 18, wherein said first receiver measures said first parameter on said pilot channel at least during transmission of an access probe from said second transmitter on said random access channel and receives at least a second parameter in said access probe, said at least a second parameter indicating a desired performance level for the transmission on the random access channel, and wherein said processor determines said first power value from said at least second parameter received in said access probe.

20. The apparatus of claim 19, wherein said message transmitted by said first transmitter comprises a frame having a length, and wherein said first receiver, first processor and first transmitter repeatedly generate said message including said third parameter at a rate that is a function of said length during said transmission from said second transmitter to said first receiver on the reverse channel, and wherein, for each repetition, said third parameter indicates a power level for adjusting said transmission subsequent to said initial power level.

* * * * *

UNITED STATES PATENT AND TRADEMARK OFFICE
CERTIFICATE OF CORRECTION

PATENT NO.   : 6,498,785 B1                                                  Page 1 of 1
DATED        : December 24, 2002
INVENTOR(S)  : Derryberry et al.

It is certified that error appears in the above-identified patent and that said Letters Patent is hereby corrected as shown below:

Column 12,
Line 24, "powder" should read -- power --.

Signed and Sealed this

Twenty-eighth Day of February, 2006

JON W. DUDAS
*Director of the United States Patent and Trademark Office*